United States Patent [19]
Bell

[11] Patent Number: 5,996,982
[45] Date of Patent: Dec. 7, 1999

[54] VEHICLE SHOCK ABSORBER WITH COIL OVER PRELOAD ADJUSTMENT

[75] Inventor: Stephen H. Bell, Guelph, Canada

[73] Assignee: Gabriel Ride Control Products, Inc., Brentwood, Tenn.

[21] Appl. No.: 08/902,117

[22] Filed: Jul. 29, 1997

[51] Int. Cl.⁶ .................................................. B60G 13/00
[52] U.S. Cl. .......................................................... 267/221
[58] Field of Search .................................. 267/220, 221, 267/170, 177, 255, 34, 287, 175; 188/322.19, 299.1

[56] References Cited

U.S. PATENT DOCUMENTS

| | | | |
|---|---|---|---|
| 3,603,575 | 9/1971 | Arlasky | 267/34 |
| 4,348,016 | 9/1982 | Milly | 267/177 |
| 5,044,614 | 9/1991 | Rau | 267/221 |
| 5,477,948 | 12/1995 | Stevens | 188/322.11 |
| 5,553,836 | 9/1996 | Ericson | 267/286 |
| 5,711,514 | 1/1998 | Lu | 267/221 |
| 5,803,443 | 9/1998 | Chang | 267/221 |

*Primary Examiner*—Chris Schwartz
*Assistant Examiner*—Melanie Talavera
*Attorney, Agent, or Firm*—McAndrews, Held & Malloy, Ltd.

[57] ABSTRACT

An annular nut cooperates with threaded sectors, which are formed on the reservoir tube of a shock absorber having a coil over spring preload, to provide for adjustment of the preload. The threaded sectors are equispaced angularly about the longitudinal axis of the reservoir tube of the shock absorber, and the threads of the threaded sectors are disposed in the planes that are substantially traverse to the longitudinal axis of the reservoir tube. The annular nut abuts the adjacent end of the coil over spring and the spring end is attached to the nut so that the spring and annular nut rotate together.

8 Claims, 2 Drawing Sheets

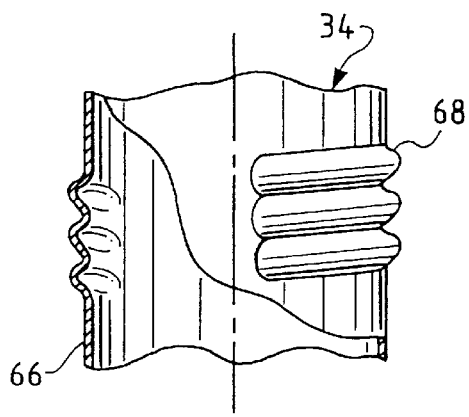
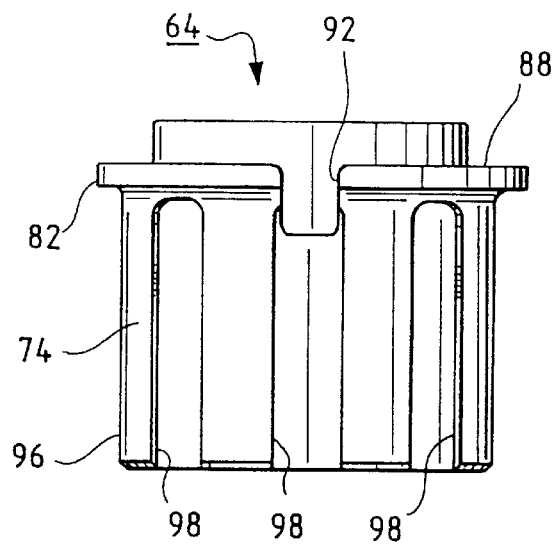
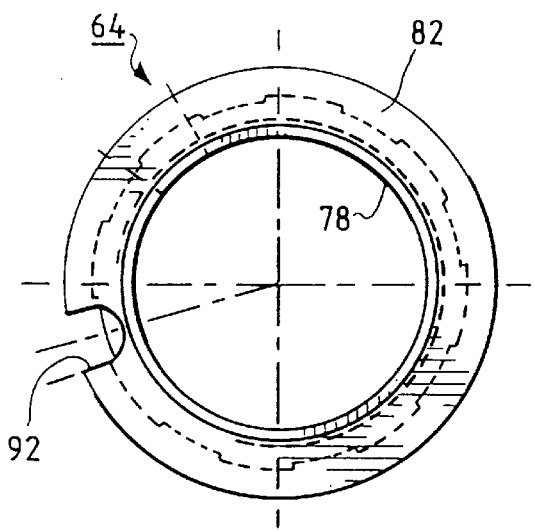
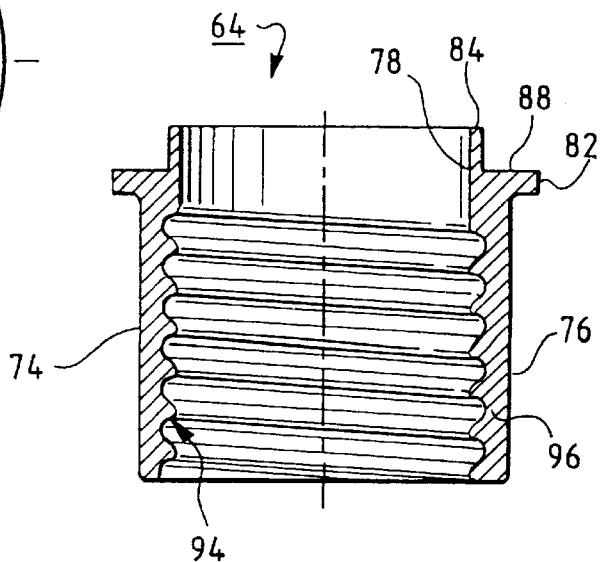

VEHICLE SHOCK ABSORBER WITH COIL OVER PRELOAD ADJUSTMENT

CROSS REFERENCE TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

The present invention relates to vehicular shock absorbers that are particularly suitable for use in snowmobiles and that have adjustable preloads applied to them by coil over springs.

The manufacture of components used in vehicles present unique and difficult challenges. Not only must the component be manufactured by mass production techniques to exacting, ever more demanding standards, but the costs of manufacturing must be minimized. The difference is fractions of a cent in the manufacturing cost is at times of importance to the acceptance of a component.

The weight of a component is also quite important particularly in components used on vehicles such as snowmobiles. For years, snowmobile manufacturers have sought to have component manufactures reduce the weight of their components so as to reduce the overall weight, and thus enhance the performance of a snowmobile. Again, even slight differences in weight are of importance and often a deciding factor in a snowmobile's manufacturer's decision to purchase a component.

Shock absorbers, which have adjustable preloads applied to them by means of coil over springs, are known and are used on snowmobiles. A shock absorber of this type is illustrated in and is indicated generally at 12 in FIG. 1. The conventional structure presently used to adjust the preloads on such shock absorbers includes an annular aluminum casting, shown at 14 in FIG. 1, that is slid over and mounted on the reservoir tube, shown at 16, of the shock absorber. A plastic adjusting nut, shown at 18 in FIG. 1, is threaded on radially outwardly facing threads on the aluminum casting 14. The lower end 22 (as seen in FIG. 1) of the coil over spring 24 abuts the adjusting nut 18. A plurality of spaced apart, radially outwardly projecting dimples 26, which are formed on the wall of the reservoir tube 16, served to hold the aluminum casting 14 axially and against rotation with respect to the reservoir tube. Rotation of the adjusting nut 18, with respect to the aluminum casting 14, results in an increase or decrease of the preload or bias applied by the coil over spring 24.

While the above prior art coil over spring adjustment structure was and is capable of adjusting satisfactorily the coil over spring applied preload, this structure has several commercially significant drawbacks. First, it requires two parts, the aluminum casting 14 and the adjusting nut 18. The casting, even though made of aluminum, is relatively heavy and adds weight to the shock absorber 12. Further, because the radial thickness of the annular aluminum casting 14, the I.D. of the coil over spring 24 must be greater than otherwise would be required for the spring to function as intended.

As might be expected, shock absorber manufacturers, as well as others in the snowmobile industry, have long sought a better, lighter weight and less costly structure for adjusting the preload applied by coil over springs to otherwise conventional shock absorbers.

BRIEF SUMMARY OF THE INVENTION

In principal aspects, my invention is directed to a lighter weight, simpler, less expensive structure for readily adjusting the preload or bias applied by a coil over spring to an otherwise conventional vehicular shock absorber that, for instance, may be used between the sprung and unsprung masses of a snowmobile. My invention eliminates the need for the aluminum casting heretofore employed as a part of the coil over spring preload adjustment structure. The elimination of this part affords commercially significant advantages.

More particularly, the elimination of the aluminum casting reduces the number of, and hence the cost of the parts needed to achieve coil over spring preload adjustment while also simplifying the assembly of the preload adjustment structure. The elimination of the aluminum casting also reduces the weight of the preload adjustment structure, and thus reduces the overall weight of the entire shock absorber assembly. Additionally, the elimination of the aluminum casting also permits the use of a smaller I.D. coil over spring without adversely effecting the spring's function. The reduction of the spring's I.D. reduces the weight, as well as the cost of the spring, and hence, that of the overall coil over spring preload adjustment structure.

Accordingly, a principal object of the present invention is to provide an improve preload adjustment structure for vehicular shock absorbers that are usable on vehicles such as snowmobiles and that have preloads applied to them by coil over springs. A related object of the present invention is to provide improved coil over spring preload adjustment structure, as described, where the adjustment structure is less expensive to make, easier to assemble and lighter in weight than the previously used adjustment structure.

Another object of the present invention is to provide improved coil over spring preload adjustment structure for shock absorbers, as described, where a plurality of radially outwardly extending threaded sectors are formed on the exterior surface of the reservoir tube of the shock absorber; where an annular nut has threads on its inwardly facing surface and includes a spring support portion that is adapted to abut the adjacent end of the coil over spring; where the annular nut threadly engages the threads of the threaded sectors on the reservoir tube whereby rotation of the annular nut relative to the reservoir tube will result in the annular nut being moved relatively, longitudinally with respect to the reservoir tube so as to change the preload or bias applied by the coil over spring on the shock absorber. A related object of the present invention is to provide the improved coil over spring adjustment structure, as described, where the spring support portion on the annular nut is an integral, radially outwardly extending flange on the end of the annular nut facing the coil over spring; and where the threaded sectors on the reservoir tube are equi-spaced angularly about the longitudinal axis of the reservoir tube.

Still another object of the present invention is to provide an improved coil over spring adjustment structure for shock absorbers, as described, where the threads of the threaded sectors may be formed in the exterior surface of the reservoir tube by expanding tooling; where the threaded sections are spaced from longitudinal extending seams in the reservoir tube so as to avoid cracking the reservoir tube; and where the adjacent end of the coil over spring is locked into and moves with the spring supporting flange on the annular nut.

These and other objects, advantages and benefits of my invention will become apparent from the following description of the preferred embodiment of my invention, made in conjunction with the following drawings.

BRIEF DESCRIPTION OF THE SEVERAL VIEWS OF THE DRAWINGS

FIG. 5 is a enlarged view, similar to that of FIG. 3, of the lower portion of the reservoir tube;

FIG. 6 is a side elevational view of the annular nut employed with the shock absorber of FIG. 2;

FIG. 7 is a top plan view of the annular nut of FIG. 6; and

FIG. 8 is a longitudinal, central cross-sectional view of the annular nut of FIG. 6.

In the following description of the preferred embodiment of my invention, "upper"; "lower", "upwardly", "downwardly" and other similar directional or orientational terms will be used. It should be understood, however, that these terms have reference only to the structure as it is shown in the FIGURES.

DETAILED DESCRIPTION OF THE PREFERRED EMBODIMENT OF THE INVENTION

Figure 2:
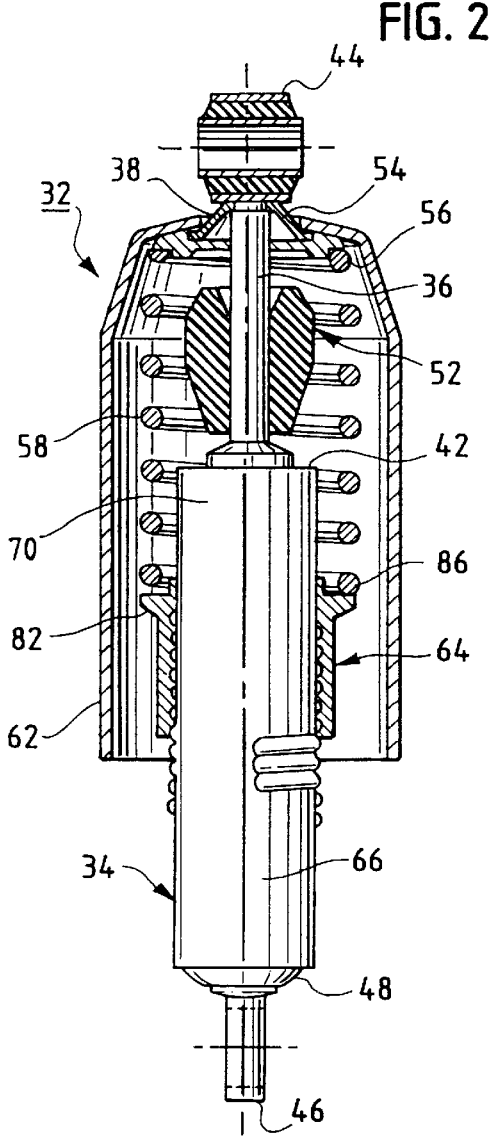
FIG. 2 is a view similar to that of FIG. 1 except that the preferred embodiment of the coil over spring adjustment structure of the present invention is illustrated.

As noted above, my invention may be used with a shock absorber of the type that may be mounted between the sprung and unsprung masses of a vehicle, such as a snowmobile. Examples of a shock absorber of this type are disclosed in my U.S. Pat. Nos. 5,234,084 and 5,542,509. Such a shock absorber is indicated generally at 32 in FIG. 2. Except as stated hereinafter, the structural and functional details of the shock absorber 32 are not part of my invention, and the shock absorber 32 may be of conventional design and construction.

More specifically, the shock absorber 32 includes a reservoir tube 34 and a piston, not shown, that reciprocally moves within the reservoir tube. As is conventional, a piston rod 36 is connected with the piston so that the piston rod moves reciprocally with the piston. The upper or distal end 38 of the piston rod 36 projects out of the upper or rod end 42 of the reservoir tube 34 through a conventional rod seal, not shown. The upper end 38 of the piston rod is connected with a conventional eye-ring 44. As is well known in the art, the eye-ring 44 is, in turn, adapted to be connected with the sprung mass of the vehicle, for example, a snowmobile. A conventional eye-ring 46 is connected with the lower or other end 48 of the reservoir tube 34 and is, in turn, adapted to be connected with the unsprung mass of the vehicle, again for example a snowmobile, as is well known in the art.

Figure 1:
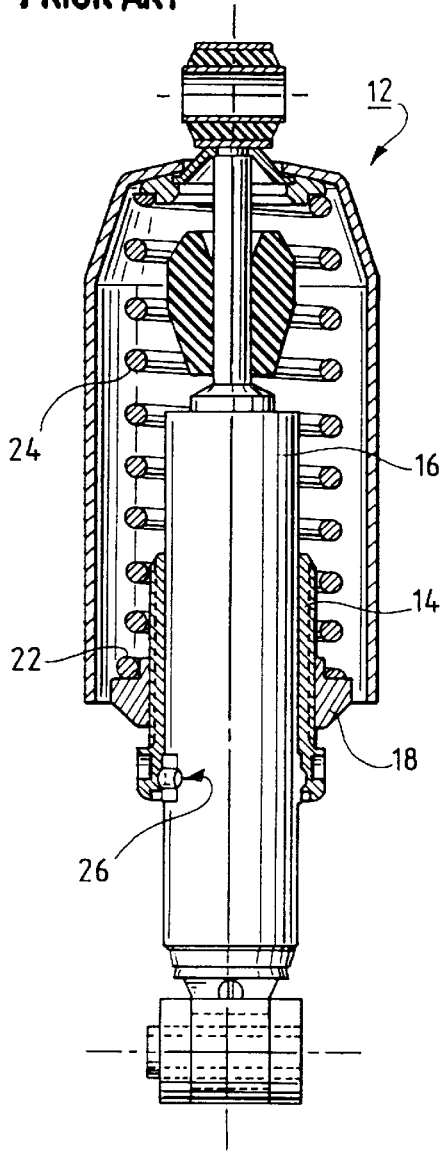
FIG. 1 is a side elevational view of a conventional shock absorber showing, in partial cross-section, the coil over spring preload adjustment structure of the prior art.

A conventional compression bumper 52 is mounted on and about the piston rod 36 between the upper end 42 of the reservoir tube 34 and the upper end 38 of the piston rod 36. A conventional spring retainer 54 is mounted on and connected with the upper end 38 of the piston rod 36 adjacent to the eye-ring 44. The upper end 56 of a conventional coil over spring 58 abuts against and is retained by the spring retainer 54 in a conventional manner. The coil over spring 58 extends downwardly from the spring retainer 54 and is disposed about the piston rod 36, bumper 52 and at least the upper part of the reservoir tube 34. As noted above, the I.D. of the spring 58 is smaller than that of the spring 24 (FIG. 1) since it does not have to fit around a radially outwardly projecting aluminum casting 14 (FIG. 1).

A conventional spring shield 62 is mounted, at its upper end, on the spring retainer 54/piston rod 36 in a conventional manner. The shield overlies and protects the spring retainer 54 and the coil over spring 58.

Figure 3:
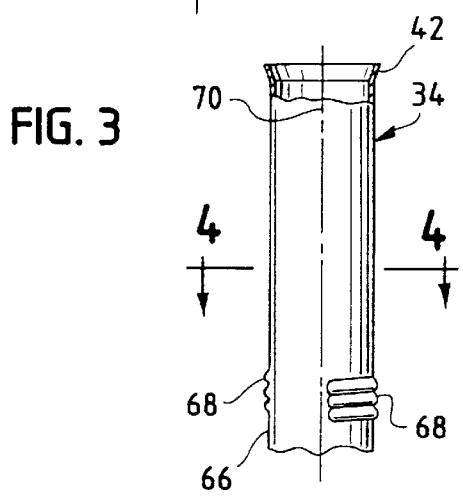
FIG. 3 is a side elevational, partial cross-sectional view of a portion of the reservoir tube of the shock absorber of FIG. 2.
Figure 4:
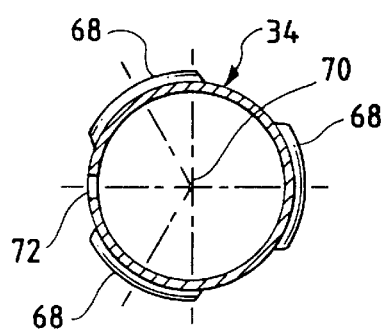
FIG. 4 is a cross-sectional view taken along the line 4—4 of FIG. 3.

As described in more detail hereinafter, an adjusting nut 64 is mounted on the generally cylindrical exterior surface 66 of the reservoir tube 34 by means of three threaded sectors 68. As best shown in FIGS. 3–5, these sectors 68 are formed on the exterior surface of the reservoir tube 34 and are equi-spaced angularly about the longitudinal central axes 70 of the reservoir tube 34 and the piston rod 36. The threads of sectors 68 all lie in planes that are substantially transverse to the longitudinal axis 70.

The threads that comprise the threaded sections 68 may be formed by the use of conventional expanding tooling in the inside diameter of the reservoir tube 34. This tooling is designed so as to force the exterior surface 66 or the side walls, of the reservoir tube 34 out and into the thread form in tooling placed over the surface 66. Usually the reservoir tube 34 will include a longitudinal seam such as that generally indicated at 72 in FIG. 4. The threaded sectors 68 are oriented so that they do not overlie the seam 72 since there is a chance that the tube 34 might crack if they did. The use of the three sectors 68 lends itself to high volume, low cycle time production of the reservoir tube 34 while providing means for securely retaining the annular nut 64 on the exterior surface 66 of the reservoir tube 34.

As best shown in FIGS. 6–8, the annular nut 64 may be molded from a plastic material such as glass filled nylon. The annular nut 64 includes a generally annular body 74 that has a radially outwardly facing surface 76, a radially inwardly facing surface 78 and a radially outwardly extending, integral flange or shoulder 82 adjacent to the upper end 84 of the body. When on the reservoir tube 34, the longitudinal axis of the annular nut 64 is co-axial with the longitudinal axis 70.

The lower end 86 of the coil over spring 58 abuts the upper surface 88 of the flange 82. As best illustrated in FIGS. 6 and 7, the flange 82 includes a relatively small, radially outwardly opening notch 92. The distal portion, not shown, of the lower end 86 of the spring 58 is bent so that it is received within the notch 92 and so that the spring and the annular nut 64 will move together. In other words, the spring 58 and the nut 64 are thus "locked" together and rotate together.

Threads 94 are molded in the inner surface 78 of the lower portion 96 of the body 74, as best shown in FIG. 8. The threads 94 are dimensioned so that they readily mate with the threads of the threaded section 68.

A plurality of longitudinal grooves 98 are molded in the outer surface 76 of the body 74. The grooves 98 extend downwardly from below the flange 82 to the lower end 96 of the body 74. They provide a grip for rotating the annular nut 64 with respect to the reservoir tube 34.

As will be apparent to those working in this art, the coil over spring 58 applies a preload or bias on the piston rod 36. This preload can be adjusted by rotating the annular nut 64 clockwise or counterclockwise with respect to the reservoir tube 34 and about the longitudinal axis 70. If the rotation of the nut 64 results in the nut moving upwardly relatively to the reservoir tube 34, that is, toward the eye-ring 44, then the preload will be increased. Conversely, if the rotation of the annular nut 64, with respect to the reservoir tube 34, results in the nut moving downwardly relative to the tube, that is, toward the eye-ring 46, the preload applied to the piston rod 36 will be decreased.

The preferred embodiment of my invention, has been described and is illustrative of my invention. It should be understood, however, that my invention is not limited to this preferred embodiment. It is therefore contemplated that the appended claims will define the scope of the invention for which I seek protection.

I claim:

1. In a shock absorber adapted for mounting between the sprung mass and unsprung mass of a vehicle and including a reservoir tube that has a longitudinal axis, that has an outer generally cylindrical exterior surface and that includes a first end and a second end which is adapted to be connected with the unsprung mass of the vehicle; a piston reciprocally movable in the reservoir tube; a piston rod connected with the piston so that the distal end of the piston rod extends out of the first end of the reservoir tube and is adapted to be connected with the sprung mass of the vehicle; and a coil over spring that is employed to apply a preload to the shock absorber, that has a first end and a second end, and that is disposed about the reservoir tube so that the first end of the coil over spring is connected and movable with the extended, distal end of the piston rod, the improvement comprising:

at least two outwardly extending threaded sectors formed on the exterior surface of the reservoir tube, each threaded sector including a plurality of threads that are radially aligned with one another about the longitudinal axis of the reservoir tube and radially offset from the threads in each other threaded sector, and the threads of the threaded sectors being in planes that are substantially transverse to the longitudinal axis of the reservoir tube; and an annular nut having a spring support portion adapted to be abutted by the second end of the coil over spring and internal threads configured to threadably engage with the threaded sectors on the exterior surface of the reservoir tube, whereby relative rotation between the annular nut and the reservoir tube will result in the annular nut being moved longitudinally with respect to the reservoir tube so as to adjust the preload being applied by the coil over spring on the shock absorber.

2. The improved shock absorber of claim 1 wherein the annular nut has a first end adjacent to the first end of the reservoir tube and which faces the distal end of the piston rod; and wherein the spring support portion is an integral, outwardly extending flange on the first end of the annular nut.

3. The improved shock absorber of claim 2 wherein the flange includes means integrally formed therewith for securing the second end of coil over spring to the annular nut.

4. The improved shock absorber of claim 3 wherein the reservoir tube has at least one longitudinally extending seam; and wherein the threaded sectors are radially spaced from the seam.

5. The improved shock absorber of claim 1 wherein the exterior surface of the reservoir tube includes three threaded sectors that are equi-spaced radially about the longitudinal axis of the reservoir tube.

6. The improved shock absorber of claim 5 wherein the annular nut has a first end is adjacent to the first end of the reservoir tube and which faces the distal end of the piston rod; and wherein the spring support portion is an integral, outwardly extending flange on the first end of the body of the annular nut.

7. The improved shock absorber of claim 6 wherein the flange includes means integrally formed therewith for securing the second end of coil over spring to the annular nut.

8. The improved shock absorber of claim 7 wherein the reservoir tube has at least one longitudinally extending seam; and wherein the threaded sectors are radially spaced from the seam.

\* \* \* \* \*